US007497962B2

(12) United States Patent
Tokunaga

(10) Patent No.: US 7,497,962 B2
(45) Date of Patent: Mar. 3, 2009

(54) METHOD OF MANUFACTURING LIQUID DISCHARGE HEAD AND METHOD OF MANUFACTURING SUBSTRATE FOR LIQUID DISCHARGE HEAD

(75) Inventor: Hiroyuki Tokunaga, Fujisawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 306 days.

(21) Appl. No.: 11/196,341

(22) Filed: Aug. 4, 2005

(65) Prior Publication Data

US 2006/0027529 A1 Feb. 9, 2006

(30) Foreign Application Priority Data

Aug. 6, 2004 (JP) ............................ 2004-231532

(51) Int. Cl.
*G01D 15/00* (2006.01)

(52) U.S. Cl. ........................................................ 216/27

(58) Field of Classification Search ...................... None
See application file for complete search history.

(56) References Cited

U.S. PATENT DOCUMENTS

| | | | | |
|---|---|---|---|---|
| 6,089,701 | A * | 7/2000 | Hashizume et al. | 347/70 |
| 6,341,851 | B1 | 1/2002 | Takayama et al. | |
| 6,378,996 | B1 * | 4/2002 | Shimada et al. | 347/70 |
| 6,502,930 | B1 * | 1/2003 | Shimada et al. | 347/71 |
| 6,712,456 | B2 * | 3/2004 | Matsuzawa et al. | 347/70 |
| 6,764,167 | B2 * | 7/2004 | Shimada et al. | 347/68 |
| 6,767,084 | B2 * | 7/2004 | Moriya et al. | 347/70 |
| 6,781,290 | B2 * | 8/2004 | Kurihara et al. | 310/360 |
| 6,796,640 | B2 * | 9/2004 | Miyata | 347/71 |
| 6,802,597 | B2 * | 10/2004 | Furuhata | 347/71 |
| 6,820,969 | B2 * | 11/2004 | Miyata | 347/71 |
| 6,869,170 | B2 * | 3/2005 | Shimada et al. | 347/68 |
| 6,883,902 | B2 * | 4/2005 | Xin-Shan et al. | 347/70 |
| 6,908,563 | B2 | 6/2005 | Tokunaga | |
| 6,929,353 | B2 * | 8/2005 | Mita et al. | 347/70 |
| 6,929,355 | B2 * | 8/2005 | Matsuzawa | 347/71 |
| 6,993,840 | B2 | 2/2006 | Mouri et al. | |
| 7,018,023 | B2 * | 3/2006 | Shimada | 347/71 |
| 7,045,935 | B2 | 5/2006 | Matsuda et al. | |
| 7,055,921 | B2 * | 6/2006 | Sumi | 347/10 |
| 7,137,179 | B2 * | 11/2006 | Yokouchi et al. | 29/25.35 |

(Continued)

FOREIGN PATENT DOCUMENTS

JP 4-312852 11/1992

(Continued)

*Primary Examiner*—Allan Olsen
(74) *Attorney, Agent, or Firm*—Fitzpatrick, Cella, Harper & Scinto

(57) ABSTRACT

A method of manufacturing a liquid discharge head, which includes a pressure generating chamber, a discharge port, and a piezoelectric element formed of a pair of electrode films sandwiching a piezoelectric material film, includes steps of preparing a structure with a single crystal Si layer accumulated above a front surface of an Si substrate through an etching stop layer; forming a buffer layer on the single crystal Si layer; forming, above the buffer layer, the piezoelectric material film which is directed in a preferential orientation to a direction of the polarization through one of the pair of electrode films; forming the pressure generating chamber on the piezoelectric material film; and etching a location corresponding to the piezoelectric material film of the Si substrate from a rear surface of the Si substrate to reach the etching stop layer.

8 Claims, 12 Drawing Sheets

U.S. PATENT DOCUMENTS

| | | | | |
|---|---|---|---|---|
| 7,152,963 | B2 * | 12/2006 | Owaki et al. | 347/68 |
| RE39,474 | E * | 1/2007 | Hashizume et al. | 29/25.35 |
| 7,187,025 | B2 * | 3/2007 | Hamada et al. | 257/295 |
| 7,210,769 | B2 * | 5/2007 | Yasoshima | 347/70 |
| 7,215,067 | B2 * | 5/2007 | Ifuku et al. | 310/357 |
| 7,244,016 | B2 * | 7/2007 | Iwashita et al. | 347/70 |
| 7,263,884 | B2 * | 9/2007 | Takahashi et al. | 73/504.15 |
| 7,279,825 | B2 * | 10/2007 | Ifuku et al. | 310/358 |
| 7,291,511 | B2 * | 11/2007 | Inaguma et al. | 438/52 |
| 7,291,520 | B2 * | 11/2007 | Murai | 438/150 |
| 2002/0140320 | A1 | 10/2002 | Unno et al. | |
| 2004/0194309 | A1 | 10/2004 | Tokunaga et al. | |
| 2004/0238485 | A1 * | 12/2004 | Hayakawa et al. | 216/27 |
| 2004/0241501 | A1 * | 12/2004 | Kijima et al. | 428/701 |
| 2005/0128255 | A1 * | 6/2005 | Nakanishi | 347/68 |
| 2005/0167712 | A1 * | 8/2005 | Kijima et al. | 257/295 |
| 2005/0213020 | A1 * | 9/2005 | Takeda et al. | 349/182 |
| 2006/0028513 | A1 | 2/2006 | Tokunaga | |

FOREIGN PATENT DOCUMENTS

| | | |
|---|---|---|
| JP | 10-181016 | 7/1998 |
| JP | 2000-246898 | 9/2000 |
| JP | 2002-234156 | 8/2002 |

* cited by examiner

METHOD OF MANUFACTURING LIQUID DISCHARGE HEAD AND METHOD OF MANUFACTURING SUBSTRATE FOR LIQUID DISCHARGE HEAD

BACKGROUND OF THE INVENTION

1. Field of the Invention

The present invention relates to a method of manufacturing a liquid discharge head (hereinafter, also referred to as “ink jet recording head”), which discharges liquid by applying energy to the liquid, and a method of manufacturing a substrate for a liquid discharge head.

2. Related Background Art

Printers with ink jet recording heads as printing apparatuses have become widely used due to their good printing performance and low costs. Ink jet recording heads such as the one which generates bubbles in ink with thermal energy to discharge ink droplets with pressure waves by those bubbles, and the one which uses pressure waves by vibrators such as a piezoelectric element, etc., have been developed.

Among the above-described ink jet recording heads, the one which uses piezoelectric elements is configured so that when a predetermined voltage is applied to an ink flow path communicated to the ink discharge port, a pressure generating chamber, and a vibration plate thin film piezoelectric element provided for this pressure generating chamber and to which a piezoelectric element thin film is bonded the piezoelectric element thin film is caused to expand and shrink and thereby the piezoelectric member and the vibration plate film oscillate in an integral fashion so that ink inside the pressure generating chamber is compressed and thereby ink droplets are discharged from the ink discharge port.

By forming a piezoelectric element thin film in a single crystal or in a preferential orientation, displacement can be large, and displacement can be controlled linearly to drive a waveform. Japanese Patent Application Laid-Open No. H10-181016 discloses a method of removing a substrate, and implementing transfer onto a vibration plate after a piezoelectric member is formed on a single crystal substrate in single crystal, or is directed in a preferential orientation.

In addition, Japanese Laid Open-Open Patent Application No. 2002-234156 discloses a piezoelectric element structure which comprises a piezoelectric film, a vibration plate and the like configuring the thin piezoelectric element so as to enable micro machining (fine processing) generally used in a semiconductor process, and which is excellent in endurance and piezoelectric property. Japanese Patent Application Laid-Open No. 2002-234156 further discloses a method of forming a piezoelectric element thin film in single crystal or directed in a preferential orientation on a so-called SOI substrate which has undergone lamination of Si single crystal onto an oxidized film.

In the recent years, ink jet recording heads have been considered not only for consumer use in printers which print letters or image information onto paper, but also for use in a field where materials have been coated with a stencil and the like or in industrial fields such as organic EL (Electro Luminescence) and the like where (red-blue-green) organic materials are coated onto a substrate.

In case of use in industrial fields, since process amounts per hour is a parameter directly relating to costs, rapidness is required. In printers for consumer use, functions to discharge fine droplets, endurance and reliability are required.

Japanese Patent Application Laid-Open No. H10-181016 caused a thin film in a single crystal or directed in a preferred orientation to the direction of the polarization, showing a perovskite structure containing a lead zirconate titanate (PZT) system or a barium titanate system as the main component, to grow in a single crystal substrate which was not directly connected with a vibration plate. Thereafter, the substrate was removed so that the vibration plate was bonded. Therefore, it was difficult to produce an ink jet recording head with nozzles disposed with high fineness.

In addition, the process disclosed in Japanese Patent Application Laid-Open No. 2002-234156 can make obtainable a piezoelectric element structure which enables micro machining (fine processing) and is excellent in endurance and piezoelectric property. Moreover, it is desired to produce an ink jet recording head which undergoes the process on a liquid chamber simply, and which is cheap and gives good yield factor and comprises nozzles disposed highly densely.

The ink jet recording head to be used in the present specification does not mean only such a type of head that discharges inks onto paper, but is also used as a collective term of such a type of head that discharges liquid onto an object disposed in a desired location.

SUMMARY OF THE INVENTION

One of objects of the present invention is to provide a manufacturing method that can make obtainable a highly dense piezoelectric element drive type ink jet recording head with a simple process and with good yield factors.

In addition, another object of the present invention is to provide a method of manufacturing a liquid discharge head comprising a pressure generating chamber communicated to a discharge port for discharging liquid and a piezoelectric element which is provided corresponding with the pressure generating chamber and includes a piezoelectric material film and a pair of electrode films sandwiching the piezoelectric material film, comprising: a step of preparing a structure with a single crystal Si layer being accumulated above a front surface of an Si substrate through an etching stop layer; a step of forming a buffer layer onto the above described single crystal Si layer; a step of forming, above the above described buffer layer, the above described piezoelectric material film consisting of a single crystal thin film or a thin film which is directed in a preferential orientation to a direction of the polarization through one of the above described pair of electrode films; a step of forming the above described pressure generating chamber on the above described piezoelectric material film; and a step of etching a location corresponding with the above described piezoelectric material film of the above described Si substrate from a rear surface of the above described Si substrate to reach the above described etching stop layer.

Still another object of the present invention is to provide a method of manufacturing a substrate for a liquid discharge head comprising a piezoelectric element which includes a piezoelectric material film and a pair of electrode films sandwiching the piezoelectric material film, comprising: a step of preparing a structure with a single crystal Si layer being accumulated above a front surface of an Si substrate through an etching stop layer; a step of forming a buffer layer on the above described single crystal Si layer; a step of forming, above the above described buffer layer, the above described piezoelectric material film consisting of a single crystal thin film or a thin film which is directed in a preferential orientation to a direction of the polarization through one of the above described electrode films; a step of etching a location corresponding with the above described piezoelectric material film of the above described Si substrate from a rear surface of the above described Si substrate to reach the above described etching stop layer.

As aforementioned, according to the present invention, a piezoelectric element drive type ink jet recording head, which gives rise to a good yield factor and is highly dense, will become obtainable. This can provide an ink jet recording head which is highly applicable to various types of inks and enables printing with high quality.

DESCRIPTION OF THE PREFERRED EMBODIMENTS

Figure 1:
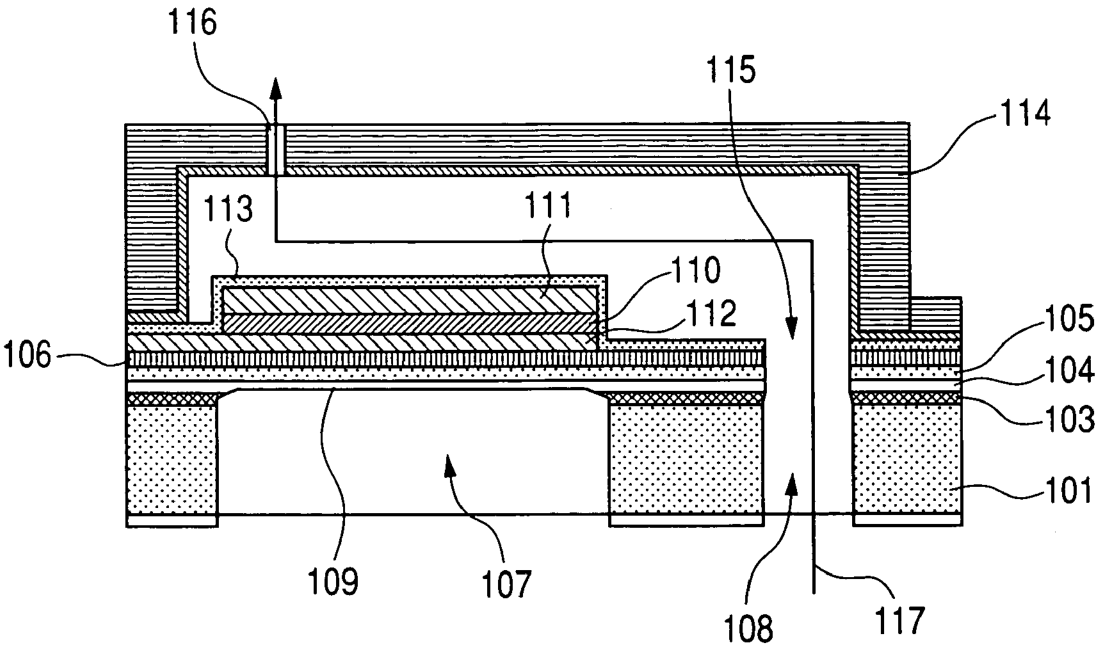
FIG. 1 is a sectional view of an ink jet recording head according to the present invention.

The present invention relates to an ink jet recording head comprising a vibration plate to cause inks to be discharged and a piezoelectric element which are formed in an ink flow path comprising a pressure generating chamber connected with an inkholder with a communication hole, wherein the piezoelectric element is formed onto a single crystal silicon film formed on an Si substrate via an insulating film and the single crystal silicon film is exposed in the side facing the space behind a vibration plate of the piezoelectric element via the above described insulating film. The piezoelectric element is preferably a single crystal thin film or a thin film directed in a preferred orientation into the direction of polarization, both showing the perovskite structure with a buffer layer and a crystal electrode are deposited onto a crystal silicon film and containing a lead zirconate titanate (PZT) system, a Relaxa system or a barium titanate system as the main component.

The vibration plate includes at least a silicon layer and an insulating film, and the insulating film is preferably a silicon nitride film.

Moreover, the plane orientation of the single crystal Si layer where the piezoelectric element is formed is preferably (100), and the Si substrate is preferably a substrate with the plane orientation of (110).

In addition, the buffer layer is preferably a film containing at least yttrium stabilized zirconia (YSZ).

In the case where the ink jet recording head has a plurality of pressure generating chambers, which are preferably formed in parallel to the (111) plane of the silicon substrate and formed in series in the direction to make 90 degrees to the (111) plane of the silicon substrate.

Moreover, the present invention is a method of manufacturing an ink jet recording head, comprising: a step of forming, on the front plane of a silicon substrate, at least an insulating film to become an etching stopper film; a step of forming an etching protection film on the rear plane of the silicon substrate; a step of bringing a single crystal Si into laminating; a step of laminating a buffer layer on the single crystal Si layer; a step of forming a first electrode film; a step of piezoelectric element thin film further thereon; a step of forming a second electrode film on the piezoelectric element thin film; a step of forming a vibration plate; a step of removing the etching protection film in the location corresponding with the vibration plate as well as the location corresponding with the ink supply orifice on the rear plane of the substrate to form an opening; a step of causing the substrate to undergo etching in the region from the opening to the etching stopper layer; and a step of removing the aforementioned etching stopper layer of the aforementioned opening in the location corresponding with the ink supply orifice to form the ink supply orifice.

After the formation of the vibration plate, the vibration plate of the present invention may undergo: a step of forming a first pattern to become a forming member of the pressure generating chamber with a soluble resin onto the aforementioned silicon substrate; a step of forming an electrically conductive layer; a step of forming a second pattern to become a forming member of a discharge port with a soluble resin onto the aforementioned electrically conductive layer; a step of forming a plating layer with plating processing onto the aforementioned electrically conductive layer; a step of removing the aforementioned second pattern; and a step of removing the aforementioned first pattern.

The above described silicon substrate may be provided with sacrifice layers in portions corresponding to the opening in the vibration plate and the ink supply orifice.

The present invention will be described in further detail with reference to the drawings.

FIG. 1 is a sectional schematic diagram of an ink jet recording head showing an embodiment of the present invention. An Si wafer is used as a substrate. Onto the Si substrate, $Si_3N_4$ film 103, Si $O_2$ film 104, Si single crystal layer 105, buffer layer (YSZ: yttrium stabilized zirconia) 106, an electrode, single crystal or orientated piezoelectric film (piezoelectric material film), an electrode (an electrode film) and a vibration plate 109 are subsequently formed.

In order to form a space behind the vibration plate, the silicon substrate 101 undergoes etching and thereby a through hole is provided to become a hole/cavity 107 and an ink supply orifice 108 for supplying ink from the rear plane.

In the upper portion of the hole/cavity 107 of the Si substrate, the vibration plate 109, the piezoelectric member thin film 110, the upper electrode 111, the lower electrode 112 and a protection film 113 and the like are formed.

On the substrate, individual pressure generating chambers 114 are formed. As a material of the individual pressure generating chambers 114, resins, photosensitive resins, metals, ceramics and the like are applicable. The communication hole 115 provided at the right end of the individual pressure generating chambers 114 are communicated with a (not shown) common liquid chamber.

The ink discharge port 116 is formed at the left end of the individual pressure generating chambers 114, and the ink pushed out by deformation of the vibration plate is discharged through the path 117 so that letters are printed onto media.

Figure 2:
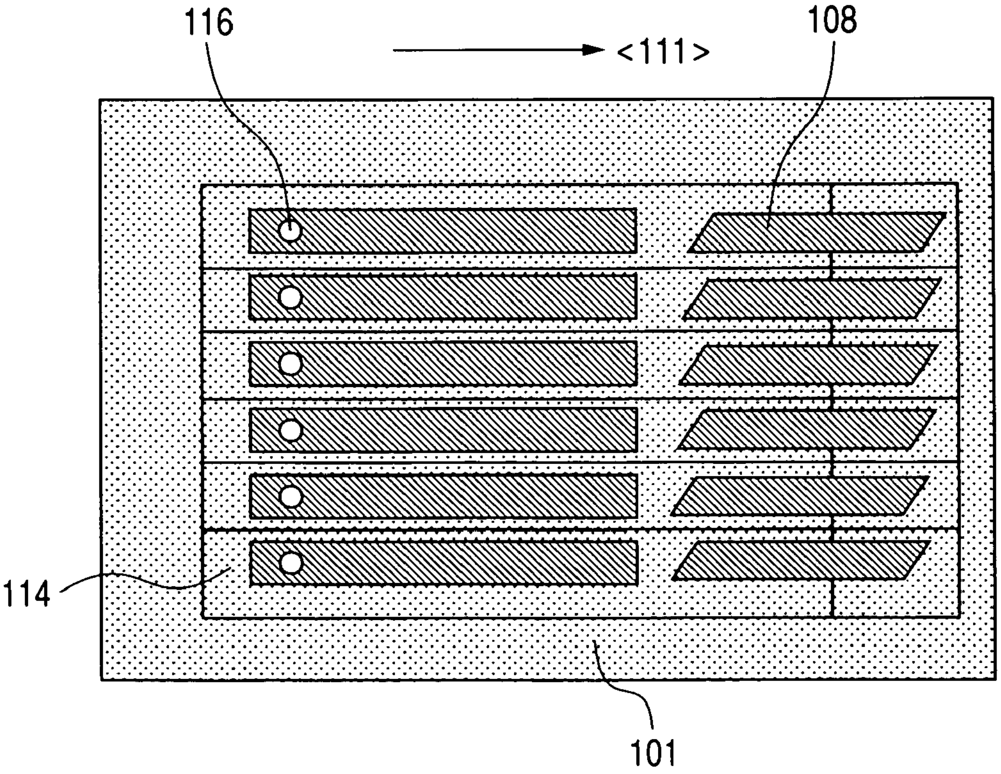
FIG. 2 is a top view of the ink jet recording head according to the present invention.
Figure 3:
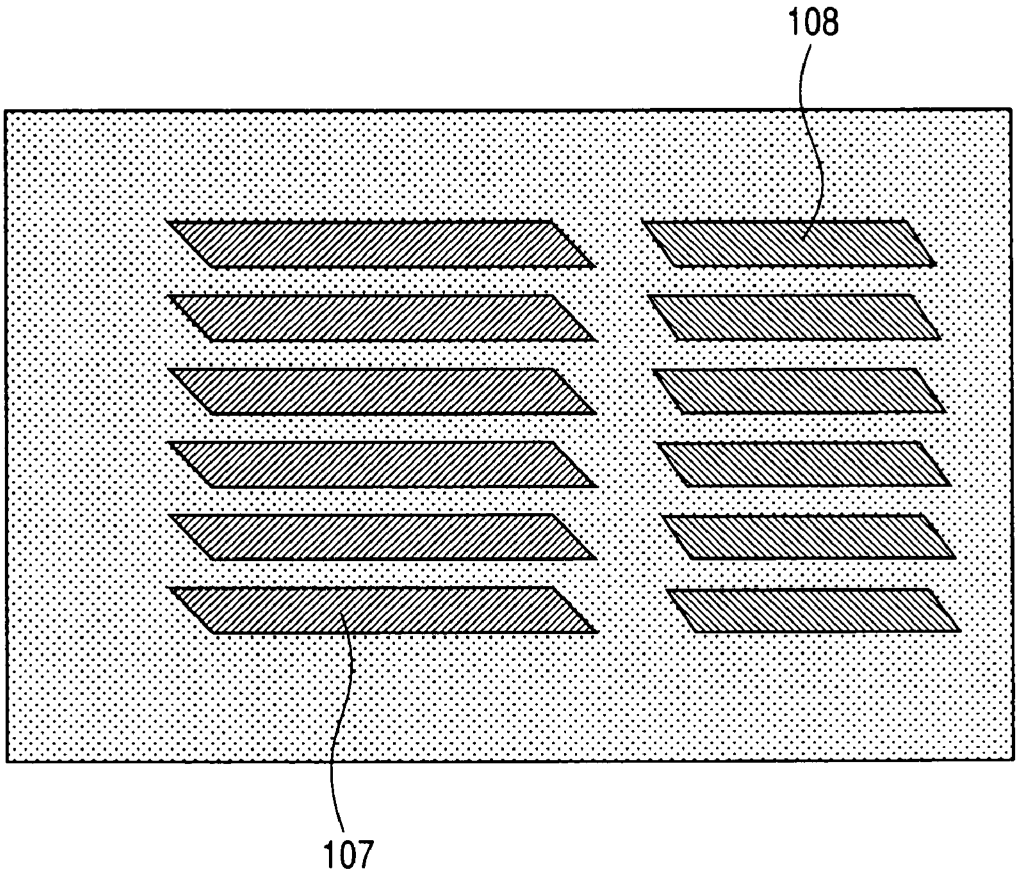
FIG. 3 is a bottom diagram of the ink jet recording head according to the present invention.

FIG. 2 is a top view of the substrate (omitting electrodes and the like). The adjacent pressure generating chambers are disposed in parallel. FIG. 3 is a rear view. The space 107 behind the vibration plate and the ink supply orifice 108 are formed by etching.

Next, steps of manufacturing the ink jet recording head of the present embodiment will be described sequentially with reference to the sectional stepwise views of FIG. 4A to FIG. 8.

Figure 8:
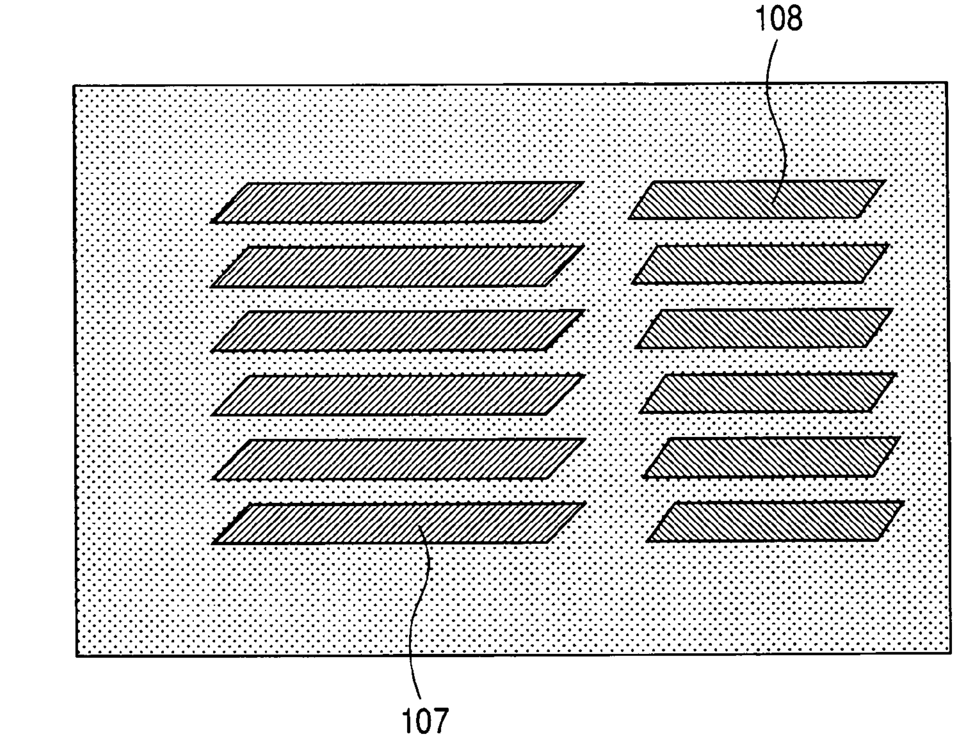
FIG. 8 is a sectional stepwise view of the ink jet recording head according to the present invention.

(1) In the silicon substrate 101 of substrate plane orientation (110), with a high density plasma etching apparatus (ICP), a parallelogram-shaped concave part corresponding with the space 107 behind the vibration plate and the ink supply orifice 108 is formed so that, as shown in the top view and FIG. 8, each line will be in parallel to the plane equivalent to the (111) plane and the narrow angle makes 70.5 degrees.

Figure 4A:
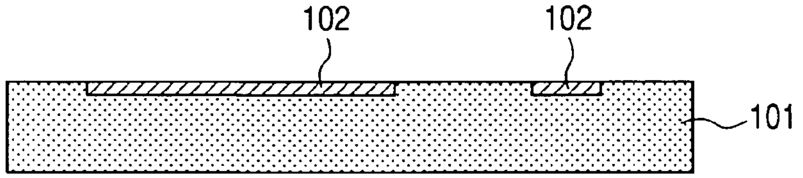
FIGS. 4A, 4B, 4C, 4D and 4E are sectional stepwise views of the ink jet recording head according to the present invention.

(2) Onto at least the plane where the parallelogram-shaped concave part has been formed in the silicon substrate 101, poly silicon or amorphous silicon is deposited with the LPCVD method and the like, and undergoes polishing so as to form a sacrifice layer 102 to make it appear that the concave part has been fulfilled (see FIG. 4A).

The substrate undergoes anisotropy etching which reaches the sacrifice layer 102 made of poly silicon, which, then is rapidly removed with etching since the etching speed is faster in polysilicon than in crystal silicon of the substrate. Also in the case where there is dispersion in thickness of the substrate, when the sacrifice layer 102 is exposed, it is rapidly removed with etching, and therefore the supply orifice can be formed accurately. As the material of the sacrifice layer 102 in the present embodiment, poly silicon or amorphous silicon was used, but any material, such as Al (aluminum, and the like), that undergoes etching with the speed faster than crystal silicon can be used.

Figure 4B:
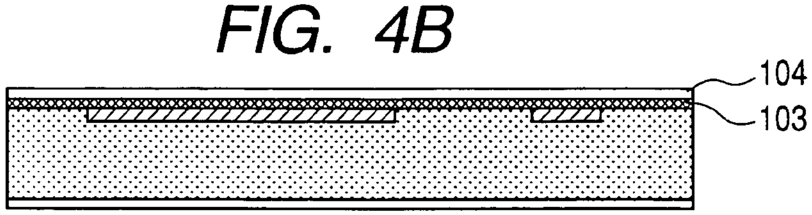

(3) Onto at least the plane where the parallelogram-shaped concave part has been formed in the silicon substrate 101, an $Si_3N_4$ film 103 with thickness of 100 to 400 nm is formed with the CVD method, and thereafter, likewise an $SiO_2$ films 104 with thickness of 100 to 400 nm are formed on the both planes of the silicon substrate 101 (see FIG. 4B).

It goes without saying that forming a $Si_3N_4$ single-layer film with thickness of 100 to 400 nm will work.

Here, it goes without saying that the $Si_3N_4$ film does not have to be composed by silicon and nitrogen with exact composition proportion of 3:4 if it can function as an etching stopper film (etching stop layer) at the time when a substrate to be described later undergoes wet etching and a nitride-oxide film will also work.

(4) A single crystal Si substrate of plane orientation (100) is laminated to this substrate under a high temperature and the single crystal Si layer 105 undergoes polishing to reach thickness of 1 to 5 μm. Another method may be employed for lamination of the single crystal silicon layer (see FIG. 4C).

The reason why the plane orientation is set to (100) for the single crystal silicon layer is to bring piezoelectric electrostrictive films into single crystal growth.

Figure 4C:
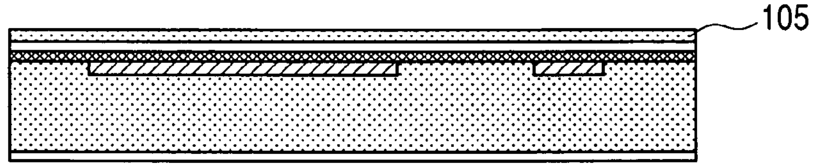
Figure 4D:
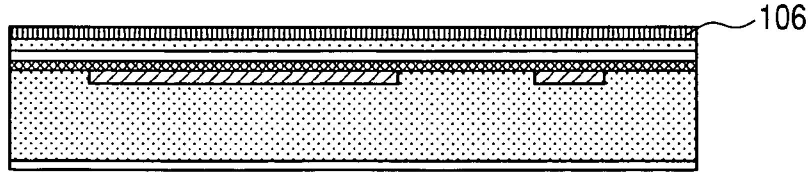

(5) A buffer layer consisting of an YSZ film 106 with thickness of 10 nm is deposited with the high temperature sputtering method under the substrate temperature 600 to 900° C. and under $Ar/O_2$ atmosphere (see FIG. 4D).

As the buffer layer, metal oxides expressed by $ZrO_2$, $CeO_2$, $SrTiO_3$ are preferably used and $ZrO_2$ is preferable.

As the ink jet head, those containing rare-earth metal elements including Sc, Y and Pr in $ZrO_2$ are more preferable. For example, those containing Y are preferable. For bringing the piezoelectric film into crystal control as a single crystal film and a single orientated film, an YSZ type material expressed by the formula $(Y_2O_3)x(ZrO_2)1-x$ containing Y (here, x is 0.01 to 0.2) is a preferable buffer layer.

(6) Matching the sacrifice layer 102 which forms the vibration plate back is formed, a metal film to become a lower layer electrode 112 is formed under the film forming temperature of 400 to 800° C. with a metal such as Pt, etc. which keeps the crystal property and endures high temperatures.

As the electrode material, metal materials or electrically conductive metal oxides can be used. As the metal material, face-centered crystal materials, body-centered crystal materials, hexagonal close-packed structure materials can be used, and a face-centered crystal material is preferable, and, for example, Pt, Ir, Pd, Rh, Ag, Al, Au, Cu, Ni and the like are preferably used, and Pt as well as Ir is more preferable.

On the other hand, also electrically conductive metal oxides are used as an electrode. As electrically conductive metal oxides, electrically conductive metal matters of perovskite type oxides can be selected for use. As oxides of a perovskite system, for example, a compound expressed by the formula $La_{1-x}Sr_xVO_3$ with $0.23<x\leqq 1$, a compound expressed by $Gd_{1-x}Sr_xVO_3$ with $0.4<x<0.5$, a compound expressed by $La_{1-x}Sr_xCoO_3$ with $0<x<1$, a compound expressed by $Ca_{1-x}Sr_xRuO_3$ with $0<x<1$ and a compound expressed by $(Ba, Ca, Sr)TiO_3-x$ with $x\neq 0$, that is, $SrRuO_3$, $CaRuO_3$, $BaPbO_3$, $La_2SrCu_2VO_{6.2}$, $SrCrO_3$, $LaNiO_3$, $LaCuO_3$, $BaRuO_3$, $SrMoO_3$, $CaMoO_3$, $BaMoO_3$, $SrIrO_3$ and the like, and $SrRuO_3$, $LaNiO_3$, $BaPbO_3$ and $CaRuO_3$ are preferable.

(7) On the lower layer electrode 112, a piezoelectric element film 110 consisting of a thin film in a single crystal or directed in a preferred orientation to the direction of the polarization, showing the perovskite structure containing a lead zirconate titanate (PZT) system or a barium titanate system as the main component is formed by a method such as sputtering or CVD and the like.

As the film forming at this time, heat film forming with 400 to 700° C. is implemented or subject to film forming under a low temperature, baking with 400 to 800° C. can be implemented.

A piezoelectric-electrostrictive film in the present invention means a piezoelectric film and/or a electrostrictive film. As a material to be used for a piezoelectric-electrostrictive film, perovskite type compounds are nominated. For example, the piezoelectric material is lead zirconate titanate $PZT[Pb(Zr_xTi_{1-x})O_3]$, barium titanate $BaTiO_3$ and the like and the electrostrictive material is a Relaxa system material. MPB (morphotoropic phase boundary) composition of lead zirconate titanate (PZT) with x from 0.40 to 0.65 is preferable, but other composition proportions will do. Crystal configuration of PZT may be any crystal configuration of either tetragonal or rhombohedral. BaTiO3 is preferably a film which is tetragonal and directed into (001) orientation. In addition, $BaTiO_3$ may contain a tiny amount of lead, bismuth, Fe and kalium.

As the electrostrictive material for use in the present invention, the following matters can be selected. For example, PMN[$Pb(Mg_xNb_{1-x})O_3$], PNN[$Pb(Nb_xNi_{1-x})O_3$], PSN[$Pb(Sc_xNb_{1-x})O_3$], PZN[$Pb(Zn_xNb_{1-x})O_3$], PMN-PT($(1-y)[Pb(Mg_xNb_{1-x})O_3]-y[PbTiO3]$) PSN-PT-($(1-y)[Pb(Sc_xNb_{1-x})O_3]-y[PbTiO_3]$), PZN-PT($(1-y)[Pb(Zn_xNb_{1-x})O_3]-y[PbTiO_3]$), LN[$LiNbO_3$] and KN[$KNbO_3$] are nominated. Here, x and y are figures of not more than 1 and not less than 0. For example, in case of PMN, x is 0.2 to 0.5 and for PSN, x is preferably 0.4 to 0.7, and y of PMN-PT is 0.2 to 0.4 and y of PSN-PT is 0.35 to 0.5 and y of PZN-Pt of 0.03 to 0.35 is preferable. In addition, PMN-PZT, PZN-PZT, PNN-PZT, PSN-PZ compounds containing Zr configured by replacing Ti in PMN-PT, PZN-PT, PNN-PT and PSN-PT will work.

A piezoelectric-electrostrictive film may be a single composition or may be a combination of 2 types or more. In addition, it may be a composition with the above described main component having undergone doping of a tiny amount of elements. The piezoelectric•electrostrictive film in the present invention subject to crystal control is good in order to express an excellent piezoelectric property, and the one with a particular orientation in a particular crystal configuration being 50% or more in terms of X-ray diffraction is preferable and moreover the one with 90% or more is more preferable.

(8.) As an electrode, for example, a lamination film of a metal such as Pt/Ti, etc. is formed on the piezoelectric member, and thereafter, being masked by a photoresist, the lamination film of a metal such as Pt/Ti and the like and the piezoelectric element film 110 undergoes etching and is removed with the photolithography method so that a piezoelectric element in a desired shape is produced.

For dry etching employed at this time, that is, etching of metal such as Pt/Ti, etc. and the piezoelectric element film, known conditions were used. For example, for etching on Pt/Ti, RIE (reactive ion etching) with combined gas of $Cl_2$ and $BCl_3$ was used.

As for this dry etching condition, using such a condition that allows etching selecting proportions of a metal configuring the lower electrode to the piezoelectric element film, subject to etching on the piezoelectric element film, implementation of overetching hardly brings the metal configuring the lower electrode into etching. Thereafter, likewise being masked by a photoresist, the lower electrode 112 in a desired shape is formed with the photolithography method.

For dry etching, known etching conditions were used.

(9) Onto the formed piezoelectric element, films of $SiN_x$ and $SiO_x$ are deposited with plasma CVD, etc., so as to be assigned to the vibration plate 109 (see the example to be described later), or as in the present example, films of $SiN_x$ and $SiO_x$ with thin thickness may be formed to be assigned to a simple protection film 113 so that the lower Si single crystal film 105 can be assigned to a vibration plate (see FIG. 5A).

Figure 5A:
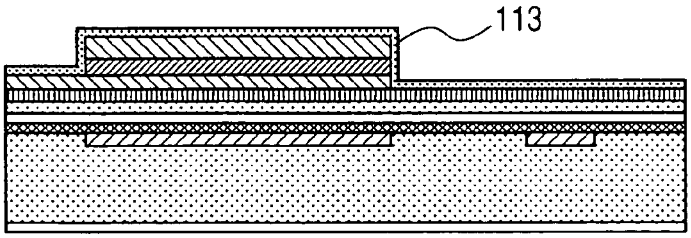
FIGS. 5A, 5B, 5C and 5D are sectional stepwise views of the ink jet recording head according to the present invention.
Figure 5B:
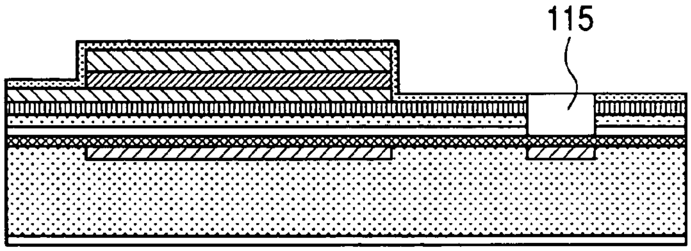

(10) An opening to become a part of the communication hole 115 to be communicated to the ink supply orifice is formed by bringing the protection film 113, the buffer layer 106, the single crystal silicon layer 105 and the $Si_3N_4$ film 103 into normal dry etching, masked by the photoresist formed with the photolithography (see FIG. 5B).

Here, since etching on a silicon nitride film such as a single crystal silicon and the $Si_3N_4$ film is normal method of manufacturing silicon semiconductors and is a known method, etching conditions will be omitted from description.

Figure 5C:
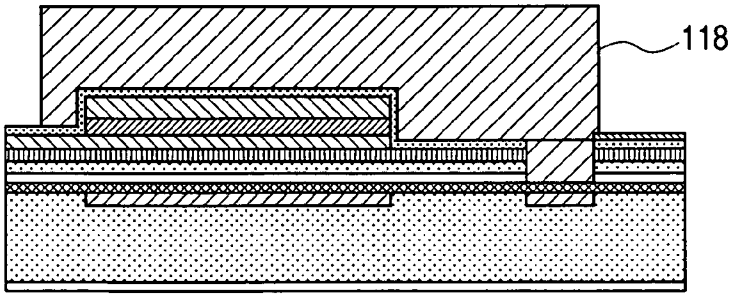

(11) Thereafter, undergoing removal, a first pattern 118 to become the mold material for forming the pressure generating chamber and the like is formed (see FIG. 5C). The method of printing and photolithography can be employed as a forming method, and the photolithography method utilizing a photosensitive resin is preferable since a fine pattern can be formed.

As the mold material, those, which are thick films, can undergo patterning and are removable afterward with alkali solution or an organic solvent, are preferable and therefore as the mold material, THB series (produced by JSR) and PMER series (produced by TOKYO OHKA KOGYO COL, LTD.) and the like can be used.

An example to be described later uses PMER HM-3000, being a product name, produced by TOKYO OHKA KOGYO COL, LTD., but naturally will not be limited to this use. Preferably, film thickness is 60 μm or less for one coating and 90 μm or less for a plurality of coating from the point of view of film thickness distribution and patterning performance.

Figure 5D:
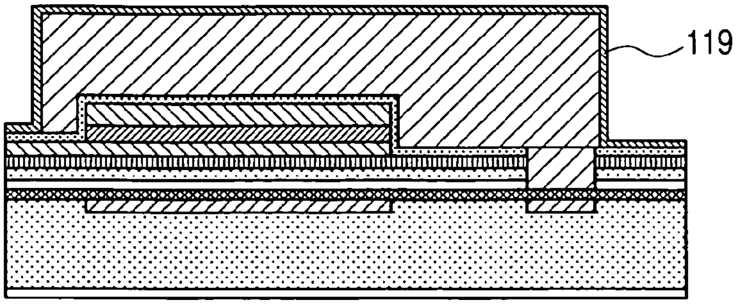

(12) The upper surface of the first pattern is brought into film forming with sputtering, etc. to provide an electrically conductive layer 119 to become a plating seed layer (FIG. 5D). As the electrically conductive layer, Pt, Au, Cu, Ni, Ti and the like can be used. Unless tight contact property between the resin to be described later and the electrically conductive layer is good to a certain extent, a fine pattern cannot be formed, and therefore after other metal films have been formed, Pt, Au, Cu, and Ni, etc. can be used for film forming to configure a lamination structure. Since it is necessary that the electrically conductive layer of the portion corresponding with the discharge port is removable in the step of removing the mold material to be described later, the upper limit of thickness of the electrically conductive layer is preferably 150 nm or less, and more preferably 100 nm or less. With thickness more than 150 nm, the portion of the electrically conductive layer corresponding with the discharge port may not be removed in its entirety in the step of removing the mold material. The lower limit of thickness of the electrically conductive layer is preferably 10 nm or more. With thickness of the electrically conductive layer being 10 nm or more, growth of plating will not be hampered.

Figure 6A:
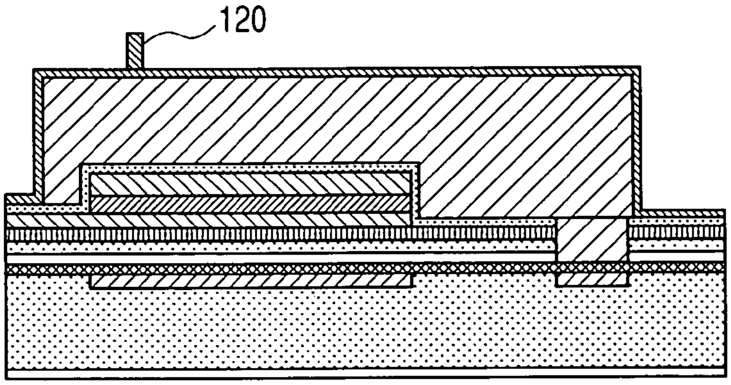
FIGS. 6A, 6B and 6C are sectional stepwise views of the ink jet recording head according to the present invention.

(13) A second pattern (discharge port mold material resist 120) to become a discharge port subject to later removal is formed on the first pattern on which the electrically conductive layer has been formed (see FIG. 6A). As the mold material, THB series (produced by JSR), PMER series (produced by TOKYO OHKA KOGYO COL, LTD.) and the like can be used.

The present example uses PMER LA-900PM, but naturally will not be limited to this, and those which are thick films, can undergo patterning and are removable afterward with alkali solution or an organic solvent will work. Film thickness is preferably 30 μm or less since more accuracy in patterning is required than that in the first pattern. That is, the first pattern and the second pattern are preferably produced to make the total of 120 μm or less.

In order to utilize the force generated in the pressure generating chamber as the discharge force efficiently, both the first pattern and the second pattern are preferably configured to taper, that is, the upper planes are smaller than the lower planes. Utilizing simulation and the like, an optimum shape can be obtained. There are various methods of forming tapering, which can be attained by keeping the distance (gap) between the substrate and the mask apart in case of a proximity type exposure device. In addition, tapering can be attained by utilizing a gray scale mask and the like as well.

Naturally, utilization of contraction of exposure such as ⅕ and 1/10, etc. makes it easy to form a micro discharge port. Moreover, utilizing a gray scale mask, it is also easy to attain complicated shapes such as a helical shape not a simple tapering shape.

Figure 6B:
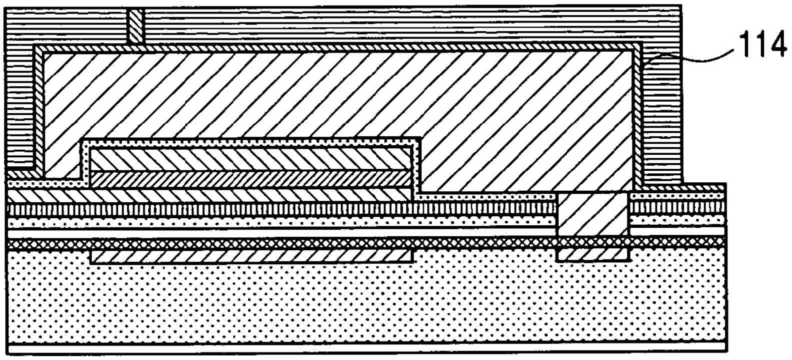

(14) A flow path structuring body 114 including the pressure generating chamber-discharge port is formed by plating processing (see FIG. 6B). Types of plating include electroplating, electroless deposition and the like, and either individual or combined use thereof is allowable. Electroplating is advantageous in such a point that processing solvent is inexpensive, making waste liquid treatment simple, while electroless deposition performs good plating, can form a uniform film and is advantageous in that the plating membrane is hard and ablation resistant.

The method of combining electroplating and electroless deposition includes, for example, a method of forming an Ni layer thickly with electroplating and thereafter forming a Ni-PTFE composite plating layer thinly with electroless deposition. This method is advantageous in that a plating layer having a membrane with a desired property is inexpensively formable.

As types of plating, single metal plating, alloy plating, composite plating to giving rise to PTFE deposition, etc. and the like are nominated. Ni is preferably used due to its chemical resistance and strength. In addition, as aforementioned, repellency to be imparted to a plating film is obtainable by employing Ni-PTFE composite plating and the like for finish of the plating step.

Here, in case of implementing plating on a substrate, the cutting region of a die preferably has undergone forming of photoresist to become a protection film of plating with, for example, the photolithography.

Figure 6C:
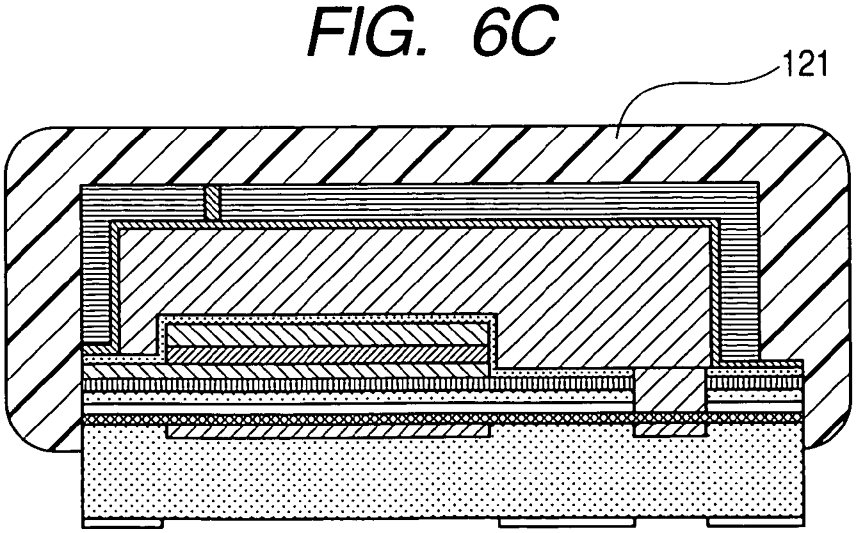

(15) In order to protect the front plane of the silicon substrate produced in the foregoing step from the etchant, the substrate surface is coated with a resin (etching protection film 121) which is alkali-resistive and afterward removable with an organic solvent and the like and the SiO2 film 104 in the location where the opening part on the rear face of the silicon substrate 101 is formed is removed (see FIG. 6C). Here, the substrate may be mounted on a jig, only the rear plane of which can be brought into contact with the etchant.

Figure 7A:
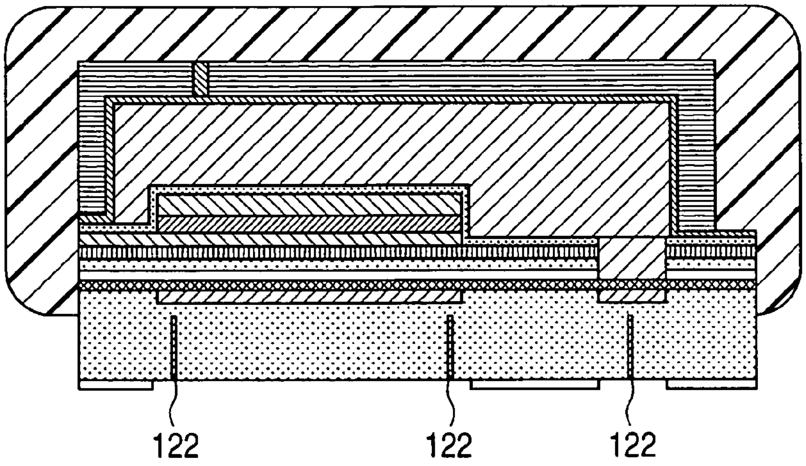
FIGS. 7A, 7B and 7C are sectional stepwise views of the ink jet recording head according to the present invention.

In a portion in the close vicinity of a narrow angled portion of a parallelogram of a boundary portion corresponding with the space behind the vibration plate 107, a leading hole 122 may be opened with laser processing (see FIG. 7A). Thereby, at the time of anisotropy etching, the plane equivalent to a diagonal (111) plane produced from the narrow angled portion of a parallelogram is restrained. This leading hole is preferably opened so as to almost reach the etching stop layer without limitation. Depth of the leading hole is generally 60% or more, preferably 70% or more and optimumly 80% or more, respectively of thickness of the substrate. Naturally the substrate must not be gone through.

Figure 7B:
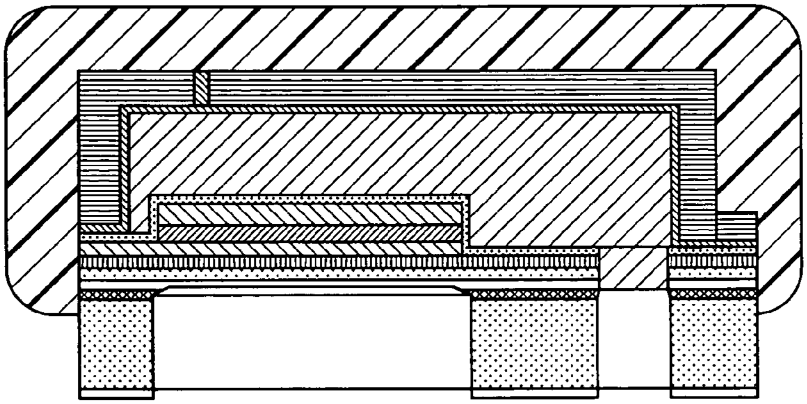

This substrate is dipped into the etchant and undergoes anisotropy etching so as to give rise to a plane equivalent to the (111) plane in the side surface, and then a plain shape can form a free space as well as an ink supply orifice (see FIG. 7B). Alkaline etchant includes KOH, TMAH (tetra methyl ammonium hydroxide) and the like, and TMAH is preferably used from an environmental point of view.

Figure 7C:
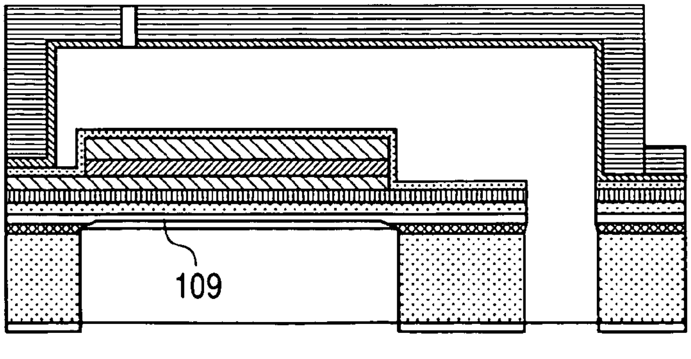

After etching, the alkali-resistive protection film 121 is removed with an organic solvent and the like (see FIG. 7C).

(16) Next, the SiN layer being the etching stop layer provided with an alkaline etchant is removed with dry etching and the like.

(17) A first pattern and a second pattern (a discharge port forming member resist 120) to constitute the forming member of a flow path structuring body including the pressure generating chamber and the discharge port is removed with alkali solution or an organic solvent.

(18) After the second pattern (the discharge port forming member resist 120) has been removed, the plating seed layer 119 exposed in the bottom of the opening part is etched away using, for example, dry etching, with a separate pressure generating chamber wall 114 as a mask.

Thereafter, cutting the substrate can obtain a die for an ink jet recording head. The steps (1) to (16) are not intended to be limited to themselves, but without using anisotropy etching, the through-hole on the rear plane can be opened with ICP. In this case, the step of burying the first sacrifice layer 102 will become unnecessary. Also for the etching stop layer, any one of an $Si_3N_4$ single layer film or a lamination layer of $SiO_2$ and $Si_3N_4$ can be selected.

In addition, for forming the seed of plating as well, the location of the seed and production procedure may be exchanged.

Here it goes without saying that for the ink jet recording head of the present invention, a plurality of pressure generating chambers are connected to the inkholder via a communication hole, and a plurality of ink jet parts each comprising a pressure generating chamber are provided.

EXAMPLE 1

FIG. 1 is a sectional schematic diagram of an ink jet recording head showing an example of the present invention. An Si substrate 101 with thickness 635 μm and with the plane orientation (110) was used as a substrate.

On an Si substrate 101, 300 nm $Si_3N_4$ film 103 was formed with LPCVD, 200 nm $SiO_2$ film 104 was formed with CVD and 2 μm of Si single crystal layer 105 by lamination and polishing; 10 nm of YSZ film was deposited as a buffer layer 105 with sputtering; 2 μm of single crystal lead zirconate titanate (PZT) 110 was deposited with sputtering; and 10/150 nm of Ti/Pt was deposited as the upper electrode 111; and thereabove 100 nm of $SiO_2$ being the protection film 113 was deposited.

In the silicon substrate, in order to form a space behind the vibration plate 109, a hole 107 to become a vibration plate back space 107 and a hole to become an ink supply orifice 108 from the rear plane were formed with anisotropy etching.

On the substrate, individual pressure generating chambers 114 were formed. The material of the pressure generating chambers were Ni and were formed with plating. The height of the inner wall of the pressure generating chamber was 60 μn and the wall thickness was 20 μm. At the end of the pressure generating chamber, a communication hole 115 was provided at the end of the pressure generating chamber, which was communicated with a (not shown) common liquid chamber.

An ink discharge port 116 with a 26 μm diameter was formed at the opposite end of the individual pressure generating chamber so that ink pushed out by deformation of the vibration plate 109 was discharged through the path indicated by an arrow 117 and thereby letters were printed onto media.

FIG. 2 is a top view of the substrate (electrode, etc. are not shown). 150 units of the adjacent pressure generating chambers were disposed in parallel in the direction perpendicular to the (111) plane of Si. The drawing depicted the individual pressure generating chambers 114. The nozzles (discharge ports 116) were covered by the individual pressure generating chambers 114, and the arrangement pitch was set at 84.7 μm.

FIG. 3 is a rear view. The pattern was formed so that the longitudinal line of the parallelogram is disposed in parallel to the (111) plane of Si, and the space 107 behind the vibration plate and the ink supply orifice 108 were formed by wet etching with TMAH. Length in the longitudinal direction of the space behind the vibration plate was set at 700 μm and length in the longitudinal direction of the ink supply orifice was set at 500 μm.

Using this head, high quality printed product without lack in discharge was obtained by aqueous ink of coefficient of viscosity 5 cp at 30 KHz and with droplets of 3 pl and 12.5 mm width.

EXAMPLE 2

Figure 9:
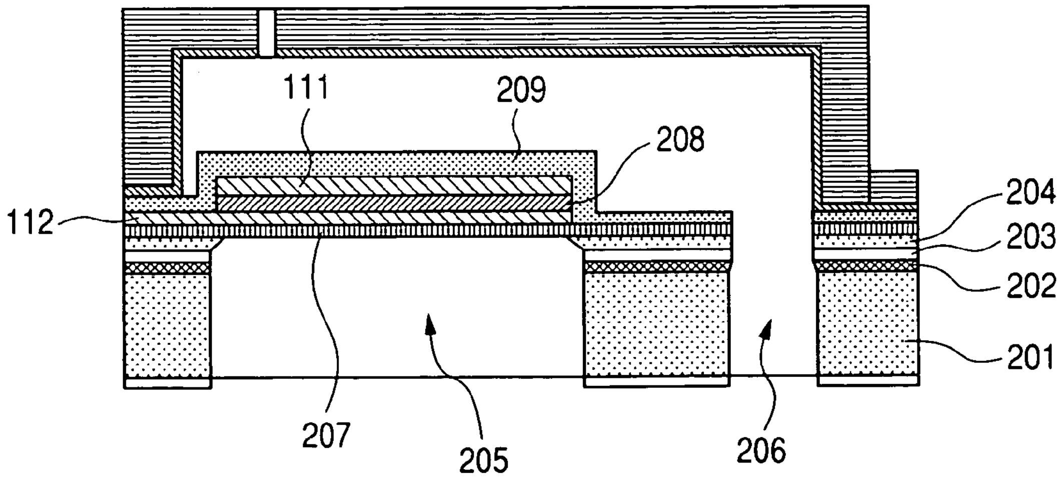
FIG. 9 is a sectional view of the ink jet recording head according to the present invention.

With FIG. 9, a second example of the present invention will be described.

In contrast with the first example where the vibration plate is formed under the piezoelectric element, in a second example, the vibration plate is formed on the piezoelectric element.

As the configuring elements, the Si vibration plate in Example 1 undergoes etching, a Pt electrode and YSZ are disposed under the piezoelectric element 208, and a 2 μm SiNx film, which is deposited with plasma CVD, is disposed on the piezoelectric element and functions as a vibration plate 209.

Using this head, a high quality printed product without lack in discharge was obtained by an ink of coefficient of viscosity 3 cp containing toluene as the main component at 15 KHz and with droplets of 3 pl and 12.5 mm width.

EXAMPLE 3

An example of the process of an ink jet recording head by the present example will be described sequentially with FIG. 4A to FIG. 4E.

(1) In the silicon substrate 101 of the outer diameter 150 mm, the thickness of 630 μm and the substrate plane orientation (110), with a high density plasma etching apparatus (ICP), as in FIG. 8 viewed from the top, parallelogram-shaped concave part (a location corresponding with the space 107 behind the vibration plate) with each line to be in parallel to the plane equivalent to the (111) plane and with longer lines of 3 mm length and shorter lines of 70 μm length, making the narrow angle of 70.5 degrees as in FIG. 8 viewed from the top and parallelogram-shaped concave (a location corresponding with the ink supply orifice 108) with longer lines of 500 μm length and shorter lines of 70 μm length were formed.

(2) Onto at least the plane where the parallelogram-shaped concave part has been formed in the silicon substrate 101, poly silicon is deposited with the LPCVD method, and undergoes polishing so as to form a sacrifice layer 102 to make the concave part to be fulfilled (see FIG. 4A).

(3) Onto the plane where the parallelogram-shaped concave part had been formed in the silicon substrate 101, an $Si_3N_4$ film 103 with thickness of 300 nm was formed with the LPCVD method.

(4) Moreover, 100 nm of $SiO_2$ film 104 was deposited on the silicon substrate 101 with thermal CVD method (see FIG. 4B).

(5) Onto the plane where the parallelogram-shaped concave part has been formed in the silicon substrate 101, a single crystal Si substrate of plane orientation (100) is laminated under a high temperature and thereafter undergoes polishing, and a single crystal Si layer 105 is formed (see FIG. 4C). An YSZ film 106 with thickness of 10 nm is formed as a buffer layer with the sputtering method under the substrate temperature 800° C. and under $Ar/O_2$ atmosphere (see FIG. 4D).

(6) Matching the sacrifice layer 102 which forms the space 107 behind the vibration plate back is formed, Pt with 150 nm thickness was deposited with the sputtering method under the substrate temperature 800° C. and under Ar atmosphere to form a lower layer electrode 112.

(7) Onto the lower layer electrode 112, a single crystal of PZT with 2 μm thickness was deposited with the reactive sputtering method under the substrate temperature 600° C. and under $Ar/O_2$ atmosphere to grow epitaxial piezoelectric element film 110.

Figure 4E:
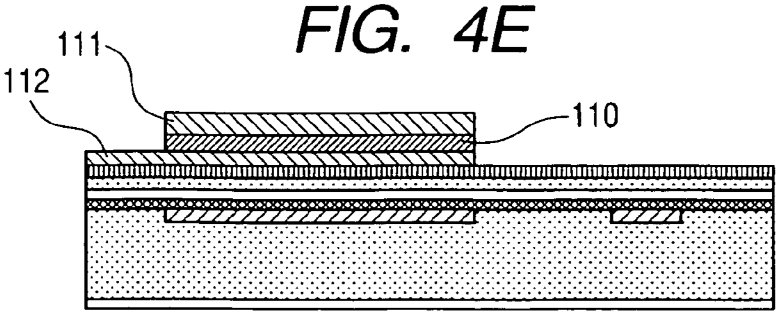

(8) Thereafter, as the upper electrode 111, 10 nm of Ti and 150 nm of Pt were deposited with the sputtering method, and underwent patterning with etching with the photolithography method to form a piezoelectric element (see FIG. 4E).

(9) Onto the formed piezoelectric element, an $SiO_x$ film was deposited with the plasma CVD method to form a protection film 113 (see FIG. 5A).

(10) A communication hole 115 to be communicated to the ink supply orifice was formed by etching (see FIG. 5B).

(11) A photoresist (product name: PMER HM-3000PM, produced by TOKYO OHKA KOGYO COL, LTD.) to become the mold material 118 of the pressure generating chamber was formed with a spinner to give 60 μm on the substrate, and after drying, underwent patterning with the photolithography method (FIG. 5C).

(12) 25 nm/75 nm respectively of Ti/Cu to become an electrically conductive layer 119 to become a plating seed layer at the time of plating underwent film forming and patterning with sputtering. Ti underwent film forming for the purpose of improving the tight contact nature and electrical conductive property to the Cu substrate.

(13) A photoresist (product name: PMER LA-900PM, produced by TOKYO OHKA KOGYO COL, LTD.) to become the mold material 120 of the discharge port was formed with a spinner to give 25 μm, and after drying, underwent patterning. Using a proximity type exposure device for exposing the mold material, the gap between the mask and the substrate was set at 120 μm to produce a tapering shape.

(14) Next, 18 μm of an Ni layer was formed with electroplating, and thereafter 3 μm of Ni-PTFE composite plating was formed with electroless deposition and assigned to a pressure chamber wall 114.

(15) Next, onto the substrate front plane, in order to protect the substrate front plane side, OBC being a cyclized rubber system resin produced by TOKYO OHKA KOGYO COL, LTD. was coated to form an etching protection film 121 (FIG. 6C). Thereafter, in a portion in the close vicinity of a narrow angled portion of a parallelogram, a leading hole 122 was opened with laser processing (see FIG. 7A). The leading hole was of 20 μm diameter and a depth of 80% of substrate thickness. The substrate underwent anisotropy etching for a predetermined period under TMAH 22 wt % and 80° C.

If the diameter of the leading hole becomes too narrow, it will become difficult to open a deep hole of 80% of the substrate (approximately 500 μm) and if the diameter is too wide, it takes so much time to form a deep opening and therefore the diameter of the leading hole is preferably approximately 15 to 30 μm.

(16) Subject to anisotropy etching, the etching protection film 121 was removed with xylene and thereafter the $Si_3N_4$ layer 103 being the etching stop layer was removed with chemical dry etching (CDE method). Here, the vibration plate 109 was formed. Lastly, using Direct Pass produced by Arakawa Chemical Industries, Ltd., the mold material was removed. At this time, the product name Pine Alpha ST-380 produced by Arakawa Chemical Industries, Ltd. was used as a solvent.

The upper plane of discharge port of the completed head was 20 μm and the lower plane was 30 μm. The separated wall of the pressure generating chamber was 21 μm. Length of the formed free space in the longitudinal direction was 3 mm, and length of the ink supply orifice in the longitudinal direction was 500 μm.

Using this head, a high quality printed product without lack in discharge was obtained by aqueous ink of coefficient of viscosity 2 cp at 25 KHz and with droplets of 5 pl.

EXAMPLE 4

Steps of manufacturing an ink jet recording head of the present example will be described sequentially with FIG. 10A to FIG. 13C.

(1) A silicon substrate 301 with the outer diameter 150 mm and the thickness of 200 μm underwent thermal oxidation, and thereafter, the front plane underwent etching and 600 nm of $SiO_2$ film 302 was formed onto the rear plane.

Figure 10A:
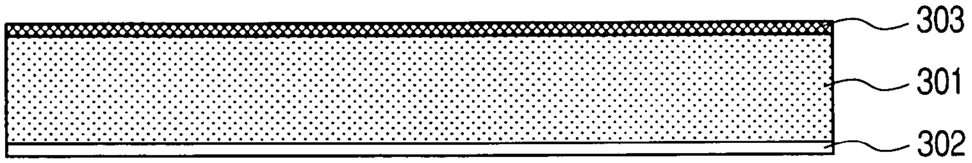
FIGS. 10A, 10B, 10C and 10D are sectional stepwise views of the ink jet recording head according to the present invention.

(2) Thereafter, onto the front plane of the silicon substrate 301, an $Si_3N_4$ film 303 with 300 nm thickness was deposited with the LPCVD method (see FIG. 10A).

Figure 10B:
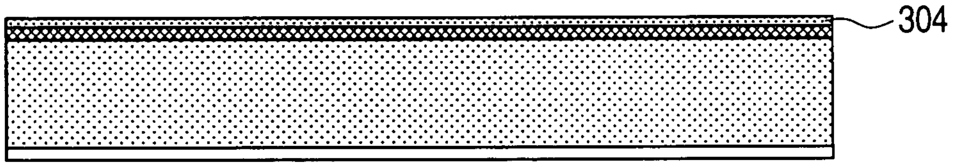

(3) Onto the front plane of the single crystal Si substrate of substrate of plane orientation (100) which underwent anodic reaction to become porous, a silicon layer subject to epitaxial growth of a single crystal Si substrate, which brought Si into epitaxial growth for 200 nm, and an $Si_3N_4$ film 303 of the silicon substrate 301 were laminated under high temperature, and thereafter, the single crystal Si substrate was pealed off from the porous layer, and the front plane underwent etching with a solution containing fluorinated acid 0.3% and hydrogen peroxide 20%, moreover underwent anealing of 1000° C. in H2 and the single crystal Si substrate 304 was formed (see FIG. 10B).

Figure 10C:
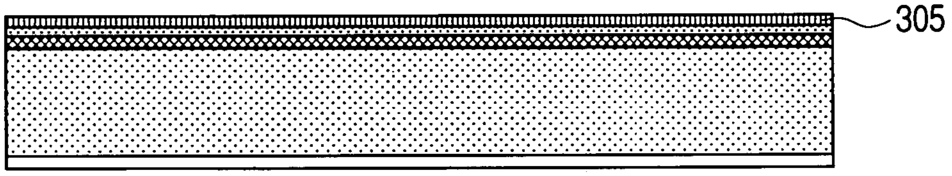

(4) A YSZ film with thickness of 10 nm was formed as a buffer layer 305 onto the single crystal Si layer 304 with the sputtering method under the substrate temperature 800° C. and under $Ar/O_2$ atmosphere (see FIG. 10C).

(5) A lower layer Pt electrode 306 of 150 nm thickness was formed with the sputtering method under the substrate temperature 800° C. and under Ar atmosphere.

(6) Onto the lower layer electrode 306, a single crystal of PZT with 2 μm thickness was deposited with the reactive sputtering method under the substrate temperature 600° C. and under $Ar/O_2$ atmosphere to grow epitaxial piezoelectric element film 307.

Figure 10D:
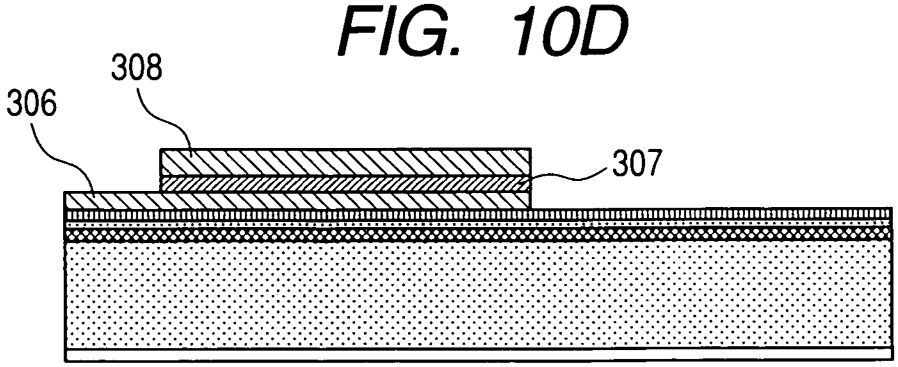

(7) As the upper electrode 308, Ti: 10 nm and Pt: 150 nm were deposited on the piezoelectric element film 307 with the sputtering method, and underwent patterning (see FIG. 10D).

Figure 11A:
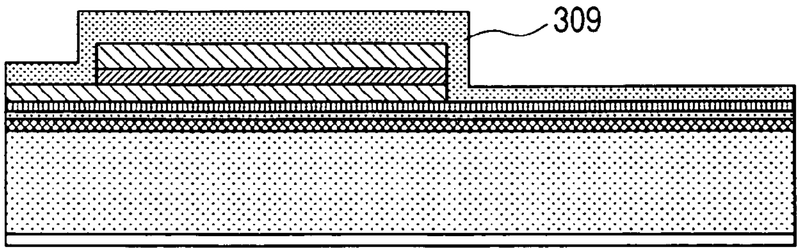
FIGS. 11A, 11B, 11C and 11D are sectional stepwise views of the ink jet recording head according to the present invention.
Figure 11B:
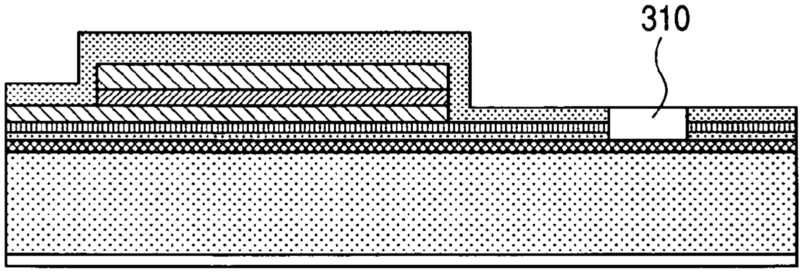
Figure 11C:
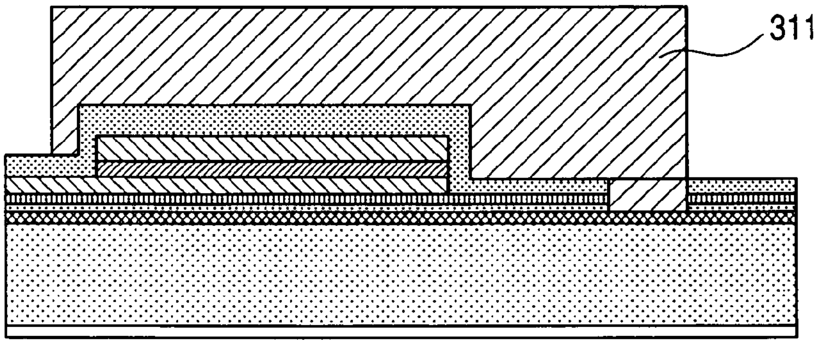
Figure 11D:
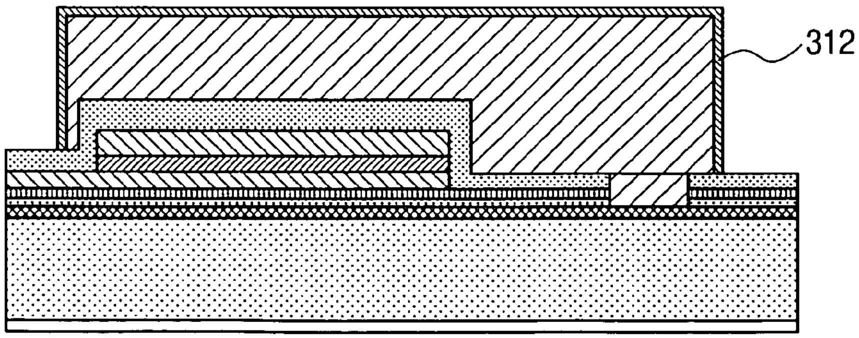

(8) Onto the formed piezoelectric element, 2 μm of $SiN_x$ film was deposited with the plasma CVD method to form a protection film 309 (see FIG. 11A).

(9) The buffer layer 305, the single crystal silicon layer 304 and the $Si_3N_4$ film 303 were removed by etching, and a communication hole 310 to be communicated to the ink supply orifice was formed.

(10) A photoresist (product name: PMER HM-3000PM, produced by TOKYO OHKA KOGYO COL, LTD.) to become the mold material 311 of the pressure generating chamber was formed with a spinner to give 60 μm on the substrate, and after drying, underwent patterning.

(11) 25 nm/75 nm respectively of Ti/Cu to become an electrically conductive layer 312 at the time of plating underwent film forming and thereafter underwent patterning with sputtering. Ti underwent film forming for the purpose of improving the tight contact nature and the electrical conductive property to the Cu substrate.

(12) A photoresist (product name: PMER LA-900PM, produced by TOKYO OHKA KOGYO COL, LTD.) to become the mold material 313 of the discharge port was formed with a spinner to give 25 μm, and after drying, underwent patterning. Using a proximity type exposure device for exposing the mold material, the gap between the mask and the substrate was set at 120 μm to produce a tapering shape.

Figure 12A:
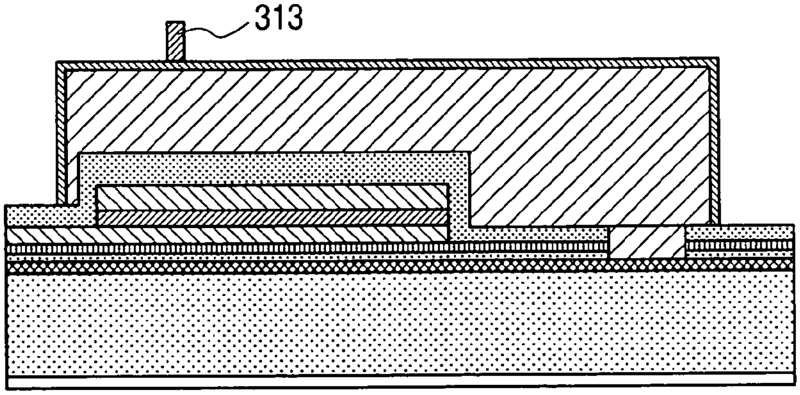
FIGS. 12A, 12B and 12C are sectional stepwise views of the ink jet recording head according to the present invention.
Figure 12B:
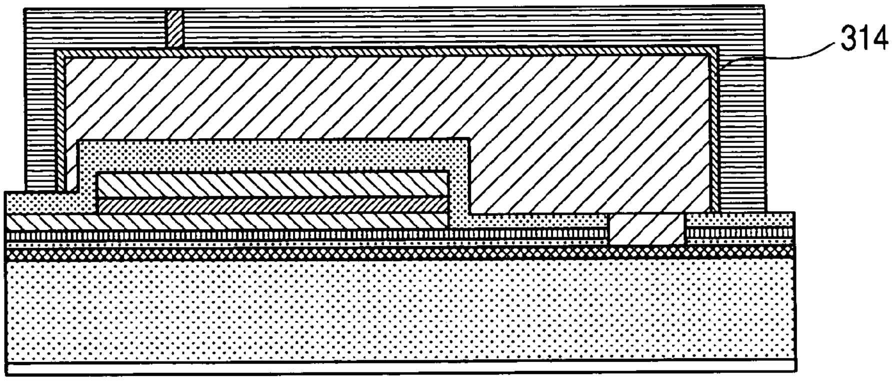

(13) Next, 18 μm of an Ni layer was formed with electroplating, and thereafter 3 μm of Ni-PTFE composite plating was formed with electroless deposition and assigned to a pressure chamber wall 314 (see FIG. 12B).

Figure 12C:
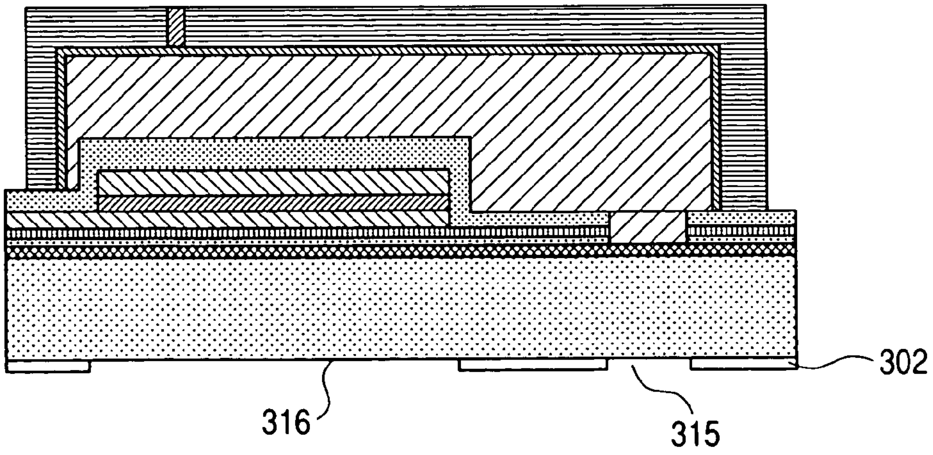

(14) $SiO_2$ film 302 on the rear plane underwent patterning as in FIG. 12C and the opening 315 as well as the opening 316 were formed. Next, using these openings, Si underwent etching with ICP to be dug out to reach $Si_3N_4$.

Figure 13A:
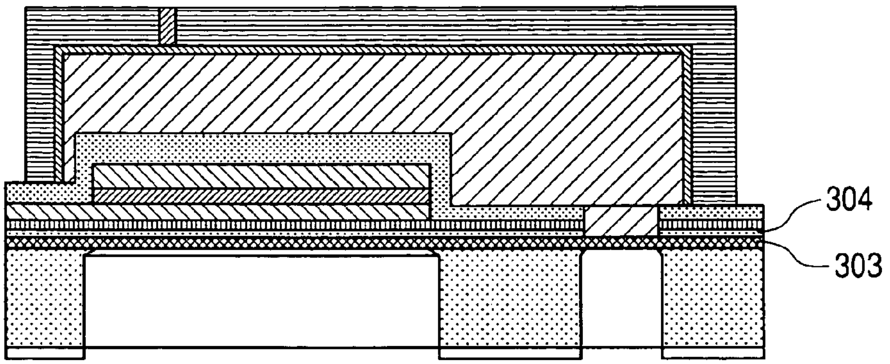
FIGS. 13A, 13B and 13C are sectional stepwise views of the ink jet recording head according to the present invention.
Figure 13B:
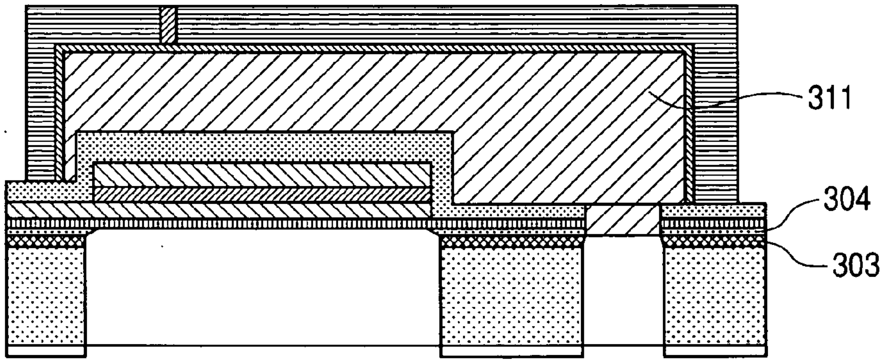
Figure 13C:
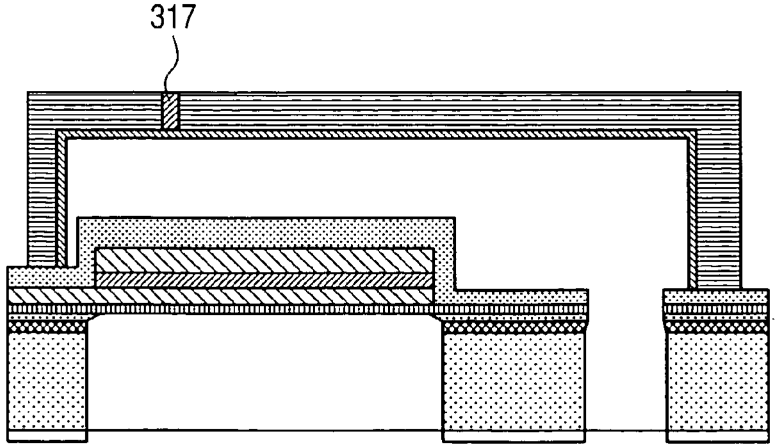
Figure 14:
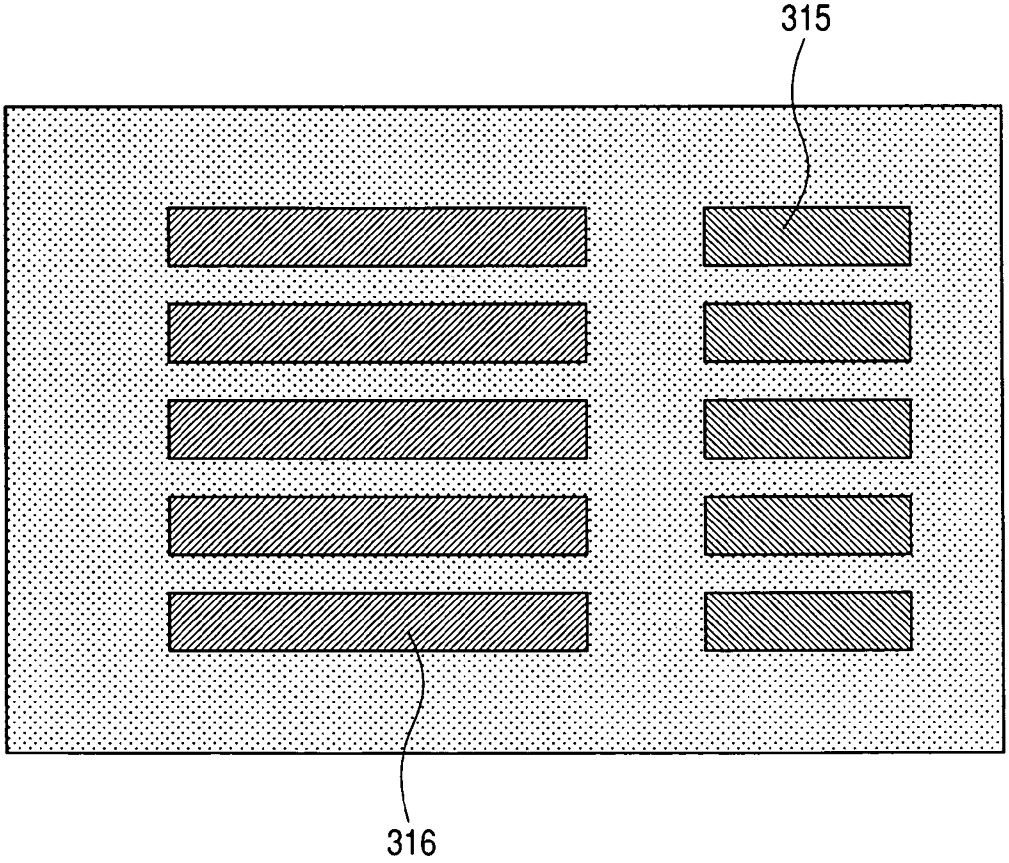
FIG. 14 is a bottom view of the ink jet recording head according to the present invention.

(15) The SiN layer 303 being the etching stop layer was removed with chemical dry etching (CDE method) (see FIG. 13B). Using Direct Pass produced by Arakawa Chemical Industries, Ltd., the mold material 311 was removed. At this time, the product name Pine Alpha ST-380 produced by Arakawa Chemical Industries, Ltd. was used as a solvent (see FIG. 13C and FIG. 14). Removing the mold material of the discharge port and the plating seed layer existing there, the liquid discharge port was manufactured.

The upper plane of discharge port of the completed head was 26 μm and the lower plane was 33 μm. The separated wall of the pressure generating chamber was 21 μm. Length of the formed free space in the longitudinal direction was 3 mm, and length of the ink supply orifice in the longitudinal direction was 500 μm.

Using this head, a high quality printed product without lack in discharge was obtained by aqueous ink of coefficient of viscosity 2 cp at 15 KHz and with droplets of 20 pl.

This application claims priority from Japanese Patent Application No. 2004-231532 filed Aug. 6, 2004, which is hereby incorporated by reference herein.

What is claimed is:

1. A method of manufacturing a liquid discharge head comprising a pressure generating chamber communicating with a discharge port for discharging liquid, and a piezoelectric element which is provided corresponding to the pressure generating chamber and includes a piezoelectric material film and a pair of electrode films sandwiching the piezoelectric material film, comprising:

a step of preparing a structure with a single crystal Si layer accumulated above a front surface of an Si substrate with an etching stop layer intervening between the single crystal Si layer and the front surface of the Si substrate;;

a step of forming a buffer layer on the single crystal Si layer;

a step of forming, above the buffer layer, the piezoelectric material film comprising a single crystal thin film or a thin film which is directed in a preferential orientation to a direction of the polarization with one of the pair of electrode films intervening between the buffer layer and the piezoelectric material film;;

a step of forming the pressure generating chamber on the piezoelectric material film; and a step of etching a location corresponding to the piezoelectric material film of the Si substrate from a rear surface of the Si substrate to reach the etching stop layer.

2. The method of manufacturing a liquid discharge head according to claim 1, wherein a sacrifice layer capable of selectively implementing etching is provided between the front plane of the Si substrate and the etching stop layer.

3. The method of manufacturing a liquid discharge head according to claim 1, further comprising a step of removing a part of the substrate and a part of the etching stop layer and thereby forming, onto the substrate, a liquid supply orifice communicating with the pressure generating chamber.

4. The method of manufacturing a liquid discharge head according to claim 1, wherein the plane orientation of the front surface of the Si substrate is {110}.

5. The method of manufacturing a liquid discharge head according to claim 1, wherein the etching comprises crystal axis anisotropy etching.

6. The method of manufacturing a liquid discharge head according to claim 1, wherein the step of forming the pressure generating chamber comprises: a step of forming a pattern to become the pressure generating chamber onto a vibration plate; a step of forming a member to configure walls of the pressure generating chamber onto the pattern; and a step of removing the pattern and forming the pressure generating chamber.

7. The method of manufacturing a liquid discharge head according to claim 6, wherein the step of removing the pattern and forming the pressure generating chamber is implemented after the step of implementing the etching.

8. A method of manufacturing a substrate for a liquid discharge head comprising a piezoelectric element which includes a piezoelectric material film and a pair of electrode films sandwiching the piezoelectric material film, comprising:

a step of preparing a structure with a single crystal Si layer accumulated above a front surface of an Si substrate with an etching stop layer intervening between the single crystal Si layer and the front surface of the Si substrate;

a step of forming a buffer layer on the single crystal Si layer;

a step of forming, above the buffer layer, the piezoelectric material film comprising a single crystal thin film or a thin film which is directed in a preferential orientation to a direction of polarization with one of the electrode films intervening between the buffer layer and the piezoelectric material film; and a step of etching a location corresponding to the piezoelectric material film of the Si substrate from a rear surface of the Si substrate to reach the etching stop layer.

* * * * *